United States Patent [19]

Passmore et al.

[11] Patent Number: 4,514,230

[45] Date of Patent: Apr. 30, 1985

[54] ALKYD COMPOSITION FOR HIGH SOLIDS COATINGS

[75] Inventors: David T. Passmore, Golborne; Brian P. Windibank, Formby, both of England

[73] Assignee: Eastman Kodak Company, Rochester, N.Y.

[21] Appl. No.: 573,187

[22] Filed: Jan. 23, 1984

[51] Int. Cl.³ .................. C08L 93/00; C08L 91/00
[52] U.S. Cl. .................................................. 106/243
[58] Field of Search ................. 106/243; 528/274, 272

[56] References Cited

U.S. PATENT DOCUMENTS 3,194,791  7/1965  Wilson et al. ................. 528/274

FOREIGN PATENT DOCUMENTS 666810  7/1963  Canada ........................... 528/272

Primary Examiner—Theodore Morris
Attorney, Agent, or Firm—John F. Stevens; Daniel B. Reece, III

[57] ABSTRACT

Disclosed is an alkyd composition adapted to be dissolved in a solvent and used as a high solids coating, said alkyd composition being derived from the following components:

(A) about 75 to about 85 mole % terephthalic, or phthalic acid,
(B) about 15 to about 25 mole % of adipic, sebacic or azelaic acid,
(C) about 6 to about 12 mole % of trimethylol ethane or trimethylol propane,
(D) about 80 to about 90 mole % neopentyl glycol, and
(E) about 4 to about 8 mole % 2,2,4-trimethyl-pentane-1,3-diol.

5 Claims, No Drawings

ALKYD COMPOSITION FOR HIGH SOLIDS COATINGS

TECHNICAL FIELD

The invention relates to alkyd compositions which when formulated in high solid coating formulations give coatings having superior drying characteristics and sag resistance compared to more conventional high solid coating compositions.

BACKGROUND INFORMATION

Increasing environmental requirements have resulted in the coatings industry developing new coating systems which are less polluting than conventional solvent-based (10-25% solids) finishes. Typical of such new systems are high solids coatings. These can have solids contents in excess of 80%.

In an attempt to reach such high level of solids at acceptable spray viscosities, resin manufacturers initially used low molecular weight, liquid resins in high solids formulations. However, the liquid nature of the resins led to problems of sag, dirt pick-up and sticky overspray, even after most of the carrier solvent(s) had evaporated. Typical of such liquid resins are those based on dimethylcyclohexane dicarboxylate and ethylene glycol.

This invention provides new compositions of matter for use in high solids coating formulations. The new compositions give coatings having good drying characteristics and good sag resistance, while also maintaining good solubility in the commonly used solvents. Solids levels of the final formulation in excess of 60 wt. % can be obtained.

DISCLOSURE OF INVENTION

According to the present invention, there is provided an alkyd composition adapted to be dissolved in a solvent and used as a high solids coating, said alkyd composition being derived from the following components:
(A) about 75 to about 85 mole % terephthalic or phthalic acid,
(B) about 15 to about 25 mole % of adipic, sebacic or azelaic acid,
(C) about 6 to about 12 mole % of trimethylol ethane or trimethylol propane,
(D) about 80 to about 90 mole % neopentyl glycol, and
(E) about 4 to about 8 mole % 2,2,4-trimethylpentane-1,3-diol,
the alkyd composition having a molecular weight of about 1000-1500 and a hydroxyl number of about 75-105, and said mole percentages being based on a total of 100 mole % acids and 100 mole % glycols in the composition. All of the reactants are commercially available.

The alkyd compositions described above may be produced using conventional procedures. A typical procedure is as follows:

| Reactants | Molar Ratio | Grams |
| --- | --- | --- |
| Dimethyl terephthalate | 0.8 | 1814 |
| Adipic acid | 0.2 | 341 |
| Neopentyl Glycol | 1.01 | 1234 |
| 2,2,4-trimethylpentane-1,3-diol | 0.07 | 121 |
| Trimethylol propane | 0.11 | 172 |

The mixture is heated to a maximum temperature of 230° C. using a conventional catalyst such as dibutyl tin dioxide (about 3.5 g). The resin is held at 230° C. until a molecular weight (number average) of about 1300 is obtained. Acid number is less than 1 and the hydroxyl number is about 85.

The following examples are submitted for a better understanding of the invention.

A pigmented coating formulation is prepared using the above-described alkyd composition. The coating formulation is typical of conventional alkyds, and is of the following approximate composition:

| Component | Function | Wt. (g) | Solids (g) |
| --- | --- | --- | --- |
| Alkyd described above | Basic Resin | 120 | 120 |
| Hexamethoxy methyl melamine | Crosslinking Agent | 30 | 30 |
| Titanium dioxide | pigment | 100 | 100 |
| Silicone flow aid (10% in ethylene glycol monoethyl ether acetate) | flow aid | 3.0 | 0.3 |
| p-toluene sulfonic acid (40% in ethylene glycol monoethyl ether acetate) | Crosslinking Agent Catalyst | 0.8 | 0.3 |
| ethylene glycol mono-butyl ether | solvent | 72 | 0 |
| ethylene glycol mono-ethyl ether acetate | solvent | 54.4 | 0 |
| n-butanol | solvent | 14.4 | 0 |

The alkyd compositions described above may be formulated into high solids coatings at solids contents in excess of 60 weight %. Conventional solvents, crosslinking agents, catalysts, pigments, flow aids, etc., may be used.

The crosslinking agents are well known in the art and many are commercially available. Suitable crosslinking agents include melamineformaldehyde condensates such as butylated melamineformaldehyde. Preferred crosslinking agents include hexaalkoxymethylmelamines wherein the alkoxy group contains from 1 to 20 carbon atoms, for example, hexamethoxymethylmelamine. Cymel 300 or 303 crosslinking agents are suitable for this use and are available from American Cyanamid Company.

Crosslinking agents may be used in amounts of about 10 to about 40, preferably about 20-30 parts, based on the total weight of the formulation excluding solvents.

Although p-toluenesulfonic acid is preferred as the acid from which the catalyst is to be formed, it should be realized that other aromatic acids could be used. Examples of other acids which can be used are: phenyl acid phosphate, butyl acid phosphate, oxalic acid, benzenesulfonic, and monobutyl acid maleate.

Catalysts may be used in amounts of about 0.1 to about 1.0 parts, based on the total weight of the formulation excluding solvents.

Conventional organic solvents may be used in preparing the formulations. Preferred are n-butanol, glycol ethers, toluene, xylene, cyclohexanone, n-butyl acetate, and glycol ether acetates.

The above-described coating composition is applied to a metal substrate and cured for 35 minutes at 177° C., and is found to have the following physical properties:

| Performance Property | |
| --- | --- |
| Gardner Gloss 60°/20° | 84/65 |
| Impact Strength-in. lb.-front | 160 (J = 18) |
| -reverse | 80 (J = 9) |
| Pencil Hardness | F |
| Solvent Resistance in methyl ethyl ketone | 195 |
| Adhesion Tape Test | Pass |
| Flexibility (0.32 cm conical mandrel) | No cracking |

The ambient temperature drying time for the coating is determined by subjectively rating the tackiness as a function of time. The tackiness is rated on a scale of 0–10 where 10 is a wet film and O is completely tack free. Tackiness ratings are as follows:

| | |
| --- | --- |
| Initial | 10 |
| 1 hour | 5 |
| 3 hours | 4 |
| 24 hours | 3 |
| 48 hours | 2 |
| 120 hours | 1 |

The alkyd described above is used in the preparation of a clear formulation. The clear formulation is of approximately the same composition as the pigmented formulations, except the pigment is omitted. The clear formulations are drawn on test panels at a 3–4 mil thickness and cured vertically for 30 minutes at 350° F. The alkyd composition is found to have 54 wt. % solids and a viscosity of 45 seconds (No. 4 Ford Cup).

The number of runs and sags in the cured films is observed and used as a measure of sag resistance. Each film is subjectively rated on a scale of 0–10 (O indicates no sagging and 10 is maximum sagging). The sag rating of the test formulation is found to be 2.

A second (No. 2) alkyd composition is prepared as follows:

| Reactant | Molar Ratio- | Weight (g) |
| --- | --- | --- |
| Neopentyl glycol | 11.84 | 1234 |
| Trimethylol propane | 1.28 | 172 |
| 2,2,4-trimethyl propane-1,3-diol | 0.83 | 121 |
| adipic acid | 2.33 | 341 |
| phthalic anhydride | 9.34 | 1382 |

A third (No. 3) alkyd composition (control) is prepared using the formula for Alkyd No. 2, except isophthalic acid is used in place of phthalic anhydride. In each preparation, the reactants are changed into a 5 liter flask with a partial reflux condenser. The reactants are heated under nitrogen according to the following cook log:
0°–170° C.—35 minutes
170°–200° C.—2 hours
200°–210° C.—6 hours The average molecular weight is found to be 1096 and the hyroxyl number is 89. Alkyd compositions No. 2 and No. 3 are used in coating compositions similar to that used in No. 1. Sag test panels are then prepared using steel test panels and a doctor applicator. After coating, the panels are left in a horizontal position at ambient temperature for 20 minutes before hanging vertically in a forced air oven for 30 minutes at 130° C. The panels are then examined for signs of sagging. Alkyd No. 2 passed sagging tests on 150 μm, 200 μm and 250 μm wet film thickness while Alkyd No. 3 failed these tests.

In using the No. 2 and No. 3 alkyd compositions in similar formulations, it is found that after 21 days, No. 2 has a suitable viscosity for coating applications, while No. 3 has precipitated.

Alkyd compositions No. 2 and No. 3 are used in a number of tests for physical properties. The results are as follows:

| | No. 2 | No. 3 (Control) |
| --- | --- | --- |
| 20° gloss | 90 | 88 |
| Adhesion tape test | Pass | Pass |
| Pencil hardness | F | F |
| Orange peel rating (0–8) (0 - poor) (8 - excellent) | 8 | 8 |
| Front impact strength in.-lbs. | 40 (J = 4.5) | 40 (J = 4.5) |
| Reverse impact strength-in.-lbs. | 4 (J = 0.45) | 4 (J = 0.45) |
| Flexibility - (.32 cm conical mandrel)-length of cracking | 11 mm | 18 mm |
| Humidity Resistance 48 Hours @ 66° C. | | |
| Gloss loss % | 27 | 20 |
| Blister rating (ASTM D714) | 10 | 10 |
| Detergent Resistance 100 Hours @ 74° C. | | |
| Gloss loss % | 54 | 44 |
| Blister rating (ASTM D714) | 8 M | 6 F |
| Adhesion tape test | Pass | Pass |

Coating compositions similar to the ones described above are prepared, but the No. 2 and No. 3 alkyds are used at a ratio of 70:30 parts by weight with the crosslinking agent rather than 80:20. Properties are found to be as follows:

| | No. 2 | No. 3 |
| --- | --- | --- |
| Viscoisity (Ford 4 Cup) - seconds | 24 | 24 |
| Theoretical solids % | 67.4 | 64.5 |
| Actual solids % | 64.8 | 62.6 |
| Viscosity after 21 days (Ford 4 Cup) - seconds | 22 | 23 |
| 20° Gloss | 93 | 89 |
| Adhesion tape test | Pass | Pass |
| Pencil hardness | H | F |
| Orange peel rating (0–8) | 8 | 8 |
| Front impact strength (in.-lbs.) | 60 (J = 6.8) | 100 (J = 11.3) |
| Reverse impact strength (in.-lbs.) | 12 (J = 1.4) | 16 (J = 1.8) |
| Flexibility ⅛" conical mandrel | No cracking | No cracking |
| Humidity resistance - 48 hours @ 66 ° C. | | |
| Gloss loss % | 42 | 33 |
| Blister rating (ASTM D714) | 10 | 10 |
| Detergent resistance 100 hours at 74° C. | | |
| Gloss loss % | 42 | 36 |
| Blister rating (ASTM D714) | 10 | 4 F |
| Adhesion tape test | Pass | Pass |

In the examples, the physical properties of the coatings are determined as follows:

Appearance Rating: In order to obtain appearance as a numerical value for identification, the following rating system for "orange peel" appearance and crater evaluation is used:

| | |
|---|---|
| 8 - None | 3 - Moderate |
| 7 - Trace | 2 - Moderate to heavy |
| 6 - Very slight | 1 - Heavy |
| 5 - Slight | 0 - Very heavy |
| 4 - Slight to moderate | |

Adhesion Tape Test: Seven horizontal score lines about 1/16 inch (0.16 cm) apart are crossed with seven vertical score lines about 1/16 inch (0.16 cm) apart using a sharp razor blade to cut through the coating to the metal. Pressure sensitive tape (Scotch brand) is pressed down firmly over the cross-hatched pattern and pulled off rapidly. A complete failure is recorded when the coating is completely peeled off. A partial failure is noted when 5 squares or more are lifted and a slight railure is identified when less than five squares are lifted. When the coating is brittle, as may occur from degradation, it does not have the cohesive strength to peel, and hence splits next to the score line giving an apparent appearance of good adhesion since the bulk of the coating is not removed. It is necessary to examine the tape and the coating for signs of such behavior being due to brittleness and not adhesion.

Impact Strength: Impact strength is determined by using a Gardner Laboratory, Inc., Impact Tester. A weight is dropped within a slide tube from a specified height to hit a punch having a ⅝ inch (1.6 cm) diameter hemispherical nose which is driven into the front (coated face) or back of the panel. The highest impact which does not crack the coating is recorded in inch-pounds, front and reverse.

Flexibility: The test panel is bent, over a period of 15 seconds, using a Gardner Laboratory, Inc., conical mandrel of specified size, according to ASTM D-522. The length of cracking is recorded.

Gardner Gloss: Twenty degree and sixty degree gloss are measured using a gloss meter (Gardner Laboratory, Inc., Model GC-9095) according to ASTM D-523.

Pencil Hardness: The pencil hardness of a coating is that of the hardest pencil that will not cut into the coating. The procedure for preparing the truncated cone pencil lead and carrying out the test is given in the National Coil Coaters Association Technical Bulletin No. II (Aug. 12, 1965). Results are expressed according to the following scale:

(softest) 6B, 5B, 4B, 3B, 2B, B, HB, F, H, 2H, 3H, 4H, 5H, 6H (hardest).

Solvent Resistance Test

Six layers of cheesecloth are held by a rubber band over the domed end of a 1½ lb. (0.68 kg) hammer.

Methyl ethyl ketone is applied so as to saturate the cheesecloth which is then drawn back and forwards across the surface of the coating in approximately 6 cm strokes. The number of double rubs to cut through of a 60 μm coating is recorded.

Humidity Resistance Test

Coated test panels are suspended in an atmosphere of 100% relative humidity at 66° C. for 48 hours. The coatings are then tested for adhesion, gloss and also blisters on a scale from 0 (large blisters) to 10 (no blisters) as described in ASTM D714.

Detergent Resistance Test

Coated test panels are suspended in a 2% solution of Tide detergent in demineralized water at a temperature of 74° C. The coatings are then examined in the same way as described for humidity resistance.

Viscosity

Viscosity measurement is made using a flow cup technique. A standard cup with a hole of carefully controlled dimensions is filled with the liquid while keeping the hole covered with a finger. The finger is removed and the time for the cup to empty is measured using a stopwatch. The technique is fully described in ASTM D1200-70.

Unless otherwise specified, all parts, percentages, ratios, etc., are on a weight basis. Where percentages by weight of acetyl, butyryl and hydroxyl contents are given, they are measured as a percentage of the total weight of one anhydroglucose unit.

It should be understood that where acids are called for herein, derivatives of such acids such as esters and anhydrides may also be used where applicable. For example, dimethyl terephthalate may be used instead of terephthalic acid, as commonly known in the art.

The invention has been described in detail with particular reference to preferred embodiments thereof, but it will be understood that variations and modifications can be effected within the spirit and scope of the invention.

We claim:

1. An alkyd composition adapted to be dissolved in a solvent and used as a high solids coating, said alkyd composition being derived from the following components:
   (A) about 75 to about 85 mole % terephthalic or phthalic acid,
   (B) about 15 to about 25 mole % of adipic, sebacic or azelaic acid,
   (C) about 6 to about 12 mole % of trimethylol ethane or trimethylol propane,
   (D) about 80 to about 90 mole % neopentyl glycol, and
   (E) about 4 to about 8 mole % 2,2,4-trimethyl-pentane-1,3-diol, said alkyd composition having a molecular weight of about 1000–1500, and a hydroxyl number of about 75–105, and said mole percentages being based on a total of 100 mole % acids and 100 mole % glycols in said composition.

2. An alkyd composition according to claim 1 comprising about 75 to about 85 mole % terephthalic acid.

3. An alkyd composition according to claim 1 comprising about 75 to about 85 mole % phthalic acid.

4. A solvent-based coating composition comprising about 25–50% by weight of the alkyd composition according to claim 1.

5. A solvent-based coating composition containing about 60 to about 85% solids by weight, about 25–50% by weight of the coating composition being the alkyd composition according to claim 1.

* * * * *